(No Model.)

J. HOBBS.
APPARATUS FOR TREATING ARTIFICIAL BUTTER.

No. 271,244. Patented Jan. 30, 1883.

Attest
Wm. H. Sonneborn
John M. O'Brien

Inventor
John Hobbs
By his atty.
John R. Bennett

UNITED STATES PATENT OFFICE.

JOHN HOBBS, OF BOSTON, MASSACHUSETTS.

APPARATUS FOR TREATING ARTIFICIAL BUTTER.

SPECIFICATION forming part of Letters Patent No. 271,244, dated January 30, 1883.

Application filed December 12, 1882. (No model.)

*To all whom it may concern:*

Be it known that I, JOHN HOBBS, of the city of Boston, in the county of Suffolk and State of Massachusetts, have invented an Improvement in Apparatus for Treating Artificial Butter and for other Purposes, of which the following is a specification.

My invention has reference to cooling apparatus in general, but more particularly that class of cooling apparatus in which the substance to be cooled has to be changed from a liquid to a solid, as in the case of solidifying the emulsion in the manufacture of artificial butter; and my invention consists in means to divide the emulsion or liquid to be cooled into small streams or particles, and discharge it in this divided condition into a cold-water tank, and in details of construction, all of which is more fully set forth in the following specification and shown in the accompanying drawings, which form part thereof.

In the manufacture of artificial butter it has heretofore been customary to discharge the emulsion in a large stream directly upon ice broken up finely, with which it is stirred by shovels. When the emulsion solidifies it must then be separated from the ice, and this is not only a slow process, but a very wasteful one.

My invention is particularly adapted to overcome the above objectionable features by causing the emulsion to be quickly cooled and solidified without contact with ice, thus requiring no stirring or subsequent separation; but it is also equally well adapted to other analogous purposes.

In this application I do not claim the process, as that forms subject-matter of another application.

Figure 1:
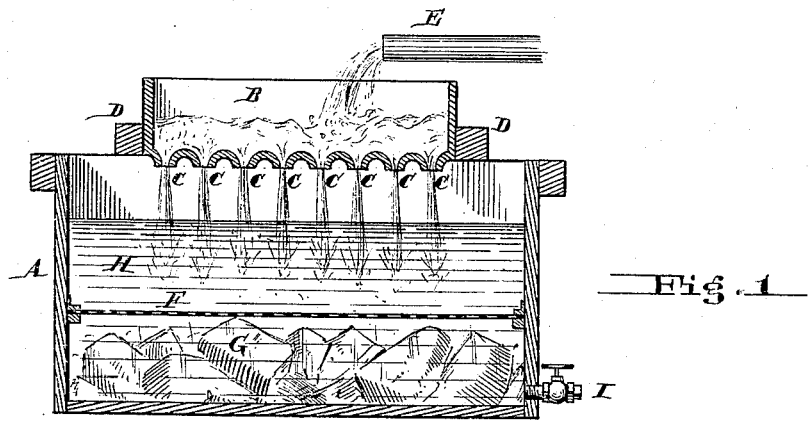
Figure 2:
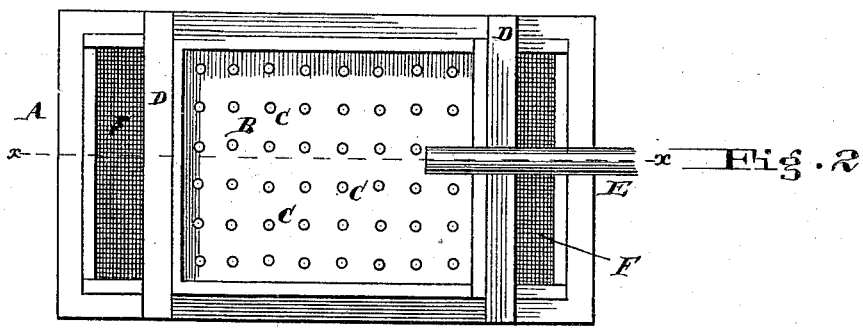

In the drawings, Figure 1 is a sectional elevation of my improved cooling apparatus on line *x x* of Fig. 2. Fig. 2 is a plan of same, and Figs. 3 and 4 are modified forms of the dividing tank or tray.

A is the cooler-tank, and is provided at the bottom with a valve, I, for discharging purposes. Secured permanently or removably a short distance above the bottom of said tank is a screen or grate, F, the purpose of which is to retain the ice below the said screen and in the bottom compartment, G, leaving the upper compartment, H, entirely clear of ice and almost full of water, which is kept cold by the ice in compartment G.

Figure 3:
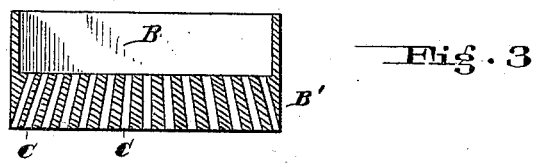
Figure 4:
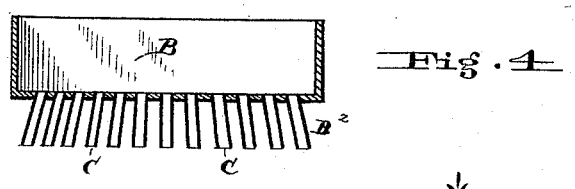

Situated above the tank A and supported by bars D, or their equivalent, is the dividing tank or tray B, provided with a perforated bottom, the apertures C of which are kept very distinct, either by having the edges of the holes pressed out, as shown in Fig. 1, by having a very thick bottom, B', as shown in Fig. 3, or by forming said apertures by means of tubes $B^2$, as shown in Fig. 4. In these two latter instances the apertures diverge from one another as they descend.

I do not limit myself to any particular shaped dividing-tray or formation of apertures therein, but have given the above as instances.

E is the discharge-pipe by which the emulsion is fed into the dividing tank or tray B. The emulsion fed to the tank B is divided into a series of small streams, as shown in Fig. 1, and is discharged into the cold water in compartment H of tank A, where it is instantly cooled and solidified, and, being lighter than water, it may be scooped up by a suitable ladle and removed. An ordinary sieve will not cause the emulsion to fall in small streams. The apertures C must be so formed that there is no tendency for the liquid to run together after being once divided.

Having now described my invention, what I claim as new, and desire to secure by Letters Patent, is—

1. Apparatus to cool an emulsion or equivalent substance, which consists in means to receive and divide the emulsion into small streams, in combination with a cold-water tank into which the said divided emulsion is discharged, substantially as and for the purpose specified.

2. Apparatus to cool an emulsion or other liquid, which consists of a dividing-tank the bottom of which is provided with small apertures, in combination with a cold-water tank having two compartments separated by a grate or screen, one of which contains ice, and into the other of which the divided emulsion is discharged, substantially as and for the purpose specified.

3. The combination of tank B, having apertures C, and tank A, having tray or grate F, the tank B being arranged above the tank A, substantially as and for the purpose specified.

In witness whereof I have hereunto set my hand.

JOHN HOBBS.

Witnesses:
 WM. B. H. DOWSE,
 JAS. A. MCGEOUGH.